United States Patent
Boyce et al.

(10) Patent No.: US 6,322,136 B2
(45) Date of Patent: Nov. 27, 2001

(54) VEHICLE HEADLINER MOUNTING STRUCTURE

(75) Inventors: Dean Arden Boyce, Waterloo; Bernard Eugene Schreyer; Daniel Joseph Mueller, both of Dubuque, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/814,247

(22) Filed: Mar. 21, 2001

Related U.S. Application Data

(63) Continuation-in-part of application No. 09/412,913, filed on Oct. 5, 1999.

(51) Int. Cl.[7] .............................. B60J 7/00; B60R 13/07; B62D 25/06; B62D 25/07
(52) U.S. Cl. ............................................................. 296/214
(58) Field of Search ............................. 296/214; 52/716, 52/716.5, 511

(56) References Cited

U.S. PATENT DOCUMENTS

| | | |
|---|---|---|
| 1,860,520 | 5/1932 | Zink . |
| 2,239,318 | 4/1941 | Haberstump . |
| 2,674,488 | 4/1954 | Lyijynen et al. . |
| 3,097,015 | 7/1963 | Nagel . |
| 3,294,436 | 12/1966 | Bull et al. . |
| 3,300,357 | 1/1967 | Doerfling . |
| 3,379,469 * | 4/1968 | Elia . |
| 3,532,377 | 10/1970 | Grasseler . |
| 3,642,317 | 2/1972 | Swindlehurst . |
| 3,868,896 | 3/1975 | Doll et al. . |
| 3,876,246 | 4/1975 | Lutz et al. . |
| 4,088,364 | 5/1978 | Termont . |
| 4,097,085 | 6/1978 | Nelson . |
| 4,186,232 | 1/1980 | Cocca et al. . |
| 4,189,987 | 2/1980 | Amberg et al. . |
| 4,600,621 * | 7/1986 | Maurer et al. . |
| 4,660,462 | 4/1987 | Thompson et al. . |
| 4,721,031 | 1/1988 | Nakata et al. . |
| 4,731,151 | 3/1988 | Kaller et al. . |
| 4,807,523 | 2/1989 | Radtke . |
| 4,923,245 | 5/1990 | Kuwabara . |
| 5,108,147 * | 4/1992 | Grimm et al. . |
| 5,280,955 | 1/1994 | Nelson et al. . |
| 5,280,991 | 1/1994 | Weiland . |
| 5,383,815 | 1/1995 | Kiesel et al. . |
| 5,636,867 | 6/1997 | McNabb et al. . |
| 5,820,199 | 10/1998 | Camplin et al. . |
| 5,876,084 | 3/1999 | Smith et al. . |
| 5,913,566 | 6/1999 | Stauffer et al. . |
| 5,921,619 * | 7/1999 | Cederberg et al. . |
| 5,942,321 | 8/1999 | Romesberg et al. . |
| 6,033,756 | 3/2000 | Handscomb . |
| 6,062,635 | 5/2000 | Learman et al. . |
| 6,070,902 | 6/2000 | Kowalski et al. . |

\* cited by examiner

Primary Examiner—Joseph D. Pape
Assistant Examiner—Scott Carpenter

(57) ABSTRACT

The roof structure of a work vehicle cab is provided with a roof panel having a top surface exposed to the outside and a bottom surface facing the interior of the cab. A sound insulating foam liner is located under the roof panel and secured thereto by adhesives. The bottom surface of the foam liner is provided with ventilating channels. The ventilating channels have two sidewalls and a top wall extending between the sidewalls. A headliner is located below the foam liner and encloses the ventilating channels formed in the foam liner thereby forming ventilating ducts. A headliner mounting structure is also disclosed in which upstanding flanges around the perimeter of the headliner have slots that receive inward extending tabs on the frame to support the headliner.

6 Claims, 5 Drawing Sheets

VEHICLE HEADLINER MOUNTING STRUCTURE

CROSS-REFERENCE TO RELATED APPLICATIONS

This application is a continuation-in-part of application Ser. No. 09/412,913 file Oct. 5, 1999.

BACKGROUND OF THE INVENTION

1. Field of the Invention

The invention is directed to the headliner of a vehicle and in particular to the mounting structure for the headliner that uses upstanding flanges with slots therein about the perimeter of the headliner, and tabs extending from the vehicle structure through the slots to support the headliner.

2. Description of the Prior Art

The operator's compartment on work vehicles used in construction, agriculture mining and forestry operations is typically provided with a roll over protection system (ROPS). In addition to protecting the operator, the operator's compartment performs many other functions. The compartment must conform to various standards and regulations for operator noise comfort, visibility and interior size. As such, the operator's compartment includes sound absorbing materials to reduce noise levels in the compartment. In addition, the operator's compartment maybe provided with a heating, ventilating and air conditioning system (HVAC) to maintain a comfortable operator work environment. The HVAC system can be mounted in the roof structure of the operator's compartment. The air is routed through a series of ducts that are usually formed of molded plastic and are provided with additional insulation to reduce heat transfer from and to the air in the duct. The ducts are usually attached to each other, the HVAC unit, to the insulation and the roof structure by various mechanical mechanisms.

Typically separate components are used for sound absorption and HVAC airflow distribution functions. Sound absorption is accomplished by adhering or mechanically fastening foam sheets to either the roof or bonding them to the headliner.

Headliners are typically mounted to the frame structure of the operator's compartment by a number of fasteners. These fasteners can be time consuming to install and are often visible from within the operator's compartment, detracting from an aesthetically pleasing interior appearance.

SUMMARY OF THE INVENTION

The operator's cab of a work vehicle is typically provided with a ROPS on which is mounted a roof structure. The roof structure is provided with a roof having a top surface exposed to the outside and a bottom surface facing the interior of the operator's compartment. A sound insulating foam liner having a top surface and a bottom surface is located under the roof. The top surface of the foam liner is secured to the bottom surface of the roof by adhesives. The bottom surface of the foam liner is provided with ventilating channels. The ventilating channels have two sidewalls and a top wall extending between the sidewalls. A headliner is located below the foam liner. The headliner has a top surface facing the bottom surface of the foam liner and a bottom surface facing the interior of the operator's compartment. The top surface of the headliner encloses the ventilating channels formed in the foam liner thereby forming ventilating ducts. The top surface of the headliner forming the bottom wall, whereas the foam liner forms the two sidewalls and the top wall of the ventilating duct.

In another aspect of the invention, the headliner is mounted to the structural frame of the operator's station by a plurality of upstanding flanges at the perimeter of the headliner with slots therethrough. The slots receive tabs extending inward from the frame. The headliner flanges are deflected inward to install the headliner and once the slots align with the tabs, the flanges return to, or near to, their nominal positions. The headliner has a foam layer that is preferably pressed against the frame to form a tight, attractive fit between the headliner and the frame.

DESCRIPTION OF THE PREFERRED EMBODIMENT

Figure 1:
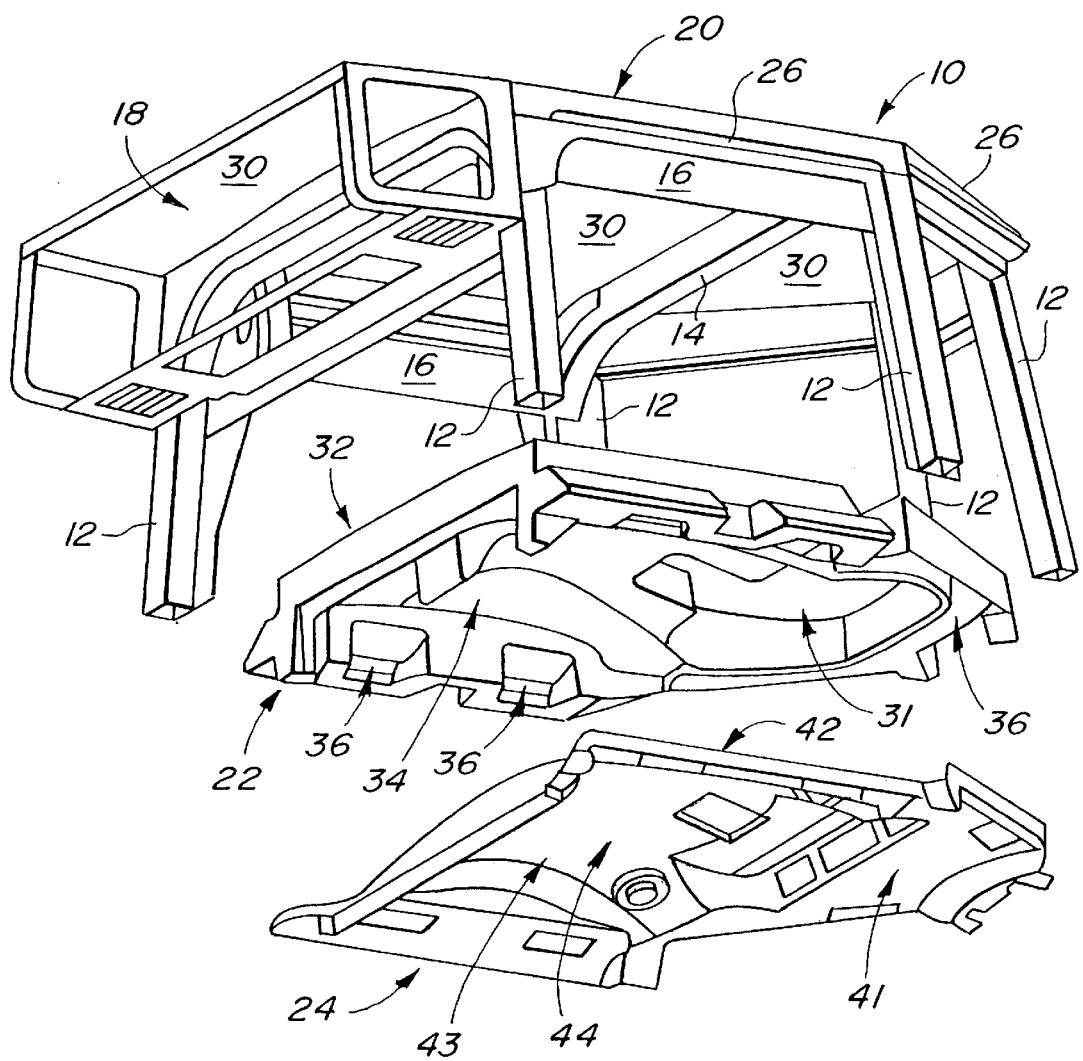
FIG. 1 is an exploded perspective view of thew roof structure of an operator's compartment.
Figure 2:
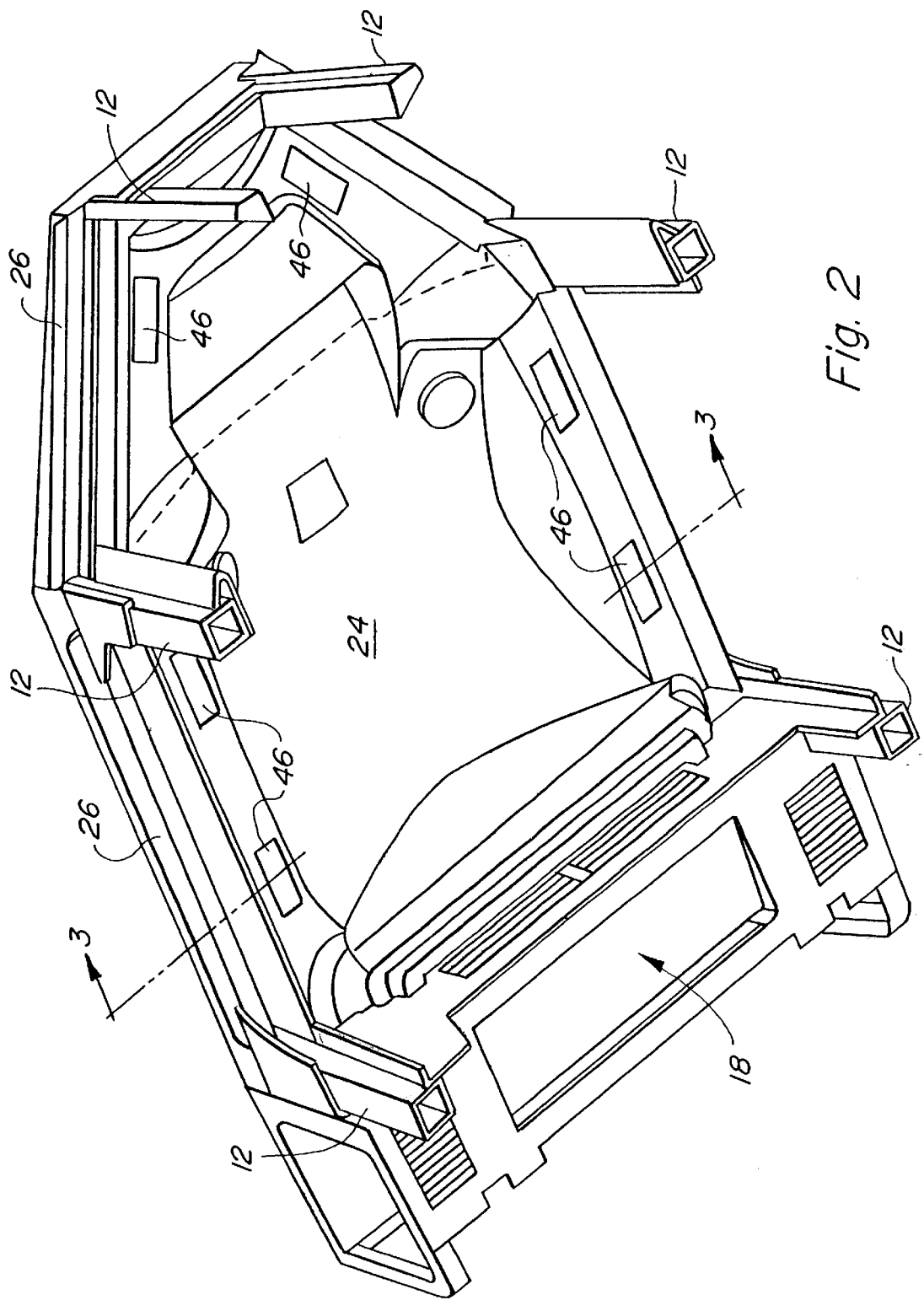
FIG. 2 is a perspective view of the roof structure of the operator's compartment the roof structure being provided with a headliner duct.

FIG. 1 illustrates the roof structure 10 of an operator's compartment for a work vehicle. The operator's compartment is defined by six vertically extending posts 12. Four of the posts 12 are tubular members that extend into horizontally extending members 14 forming the ROPS for the compartment. Two flanges 16 extend between two pairs of ROPS posts 12 downwardly from the corresponding horizontal extending members 14. The openings between the ROPS posts are provided with windows 17 (only shown in FIG. 3) and doors (not shown). A HVAC compartment 18 is located to the rear of the operator's compartment and is designed to hold a HVAC unit, not shown.

The operator's compartment is provided with a roof structure having three main components, a roof 20, a rigid sound insulating foam liner 22, and a headliner 24. In the preferred embodiment the roof is formed of sheet metal and is welded to the steel horizontally extending 14 members of the ROPS. The roof 20 also extends over the HVAC compartment 18 and is provided with drip channels 26. The roof has a top surface 28 facing the outside and a bottom surface 30 facing the interior of the operator's compartment.

The sound insulating foam liner 22 is located below the roof 20 and is formed from a polyurethane expanding foam or some similar material. The foam liner is manufactured or molded to fill the cavity formed below the roof with sound absorbing material. The foam liner could be a single part or be made up of several parts. A central forward section 31 is left open to accommodate HVAC controls and/or a radio in the roof structure. The top surface 32 of the foam liner 22 is fixed to the bottom surface 30 of the roof by adhesives. In addition, the expansion of the foam and adhesives secure the foam liner 22 to the flanges 16. The bottom surface 34 of the foam liner is provided with ventilating channels 36 having sidewalls 38 and top walls 40. These ventilating channels 36 can be placed and sized for proper air velocity and distribution. In addition, the foam reduces the airflow noise level of the HVAC system as air is moving through the ventilating channels 36.

Located immediately below the foam liner 22 is the headliner 24. The headliner is porous so that noise form the interior of the operator's compartment can be deadened by the foam liner. The headliner 24 comprises two pieces a front half 41 and a back half 43. The headliner has a top surface 42 facing the foam liner 22 and a bottom surface 44 facing the interior of the operator's compartment. The headliner 24 cooperates with the ventilating channels 36 formed in the foam liner 22 to form ventilating ducts. The headliner 24 enclosing the ventilating channels 36 by forming the bottom wall. To better seal the ventilating ducts the foam liner may be provided with molded in raised edges to increase its sealing effect when the foam liner is compressed into place. The headliner is provided with louvered vents 46 that are in pneumatic communication with the ventilating ducts to direct air into and from the interior of the operator's compartment.

Figure 3:
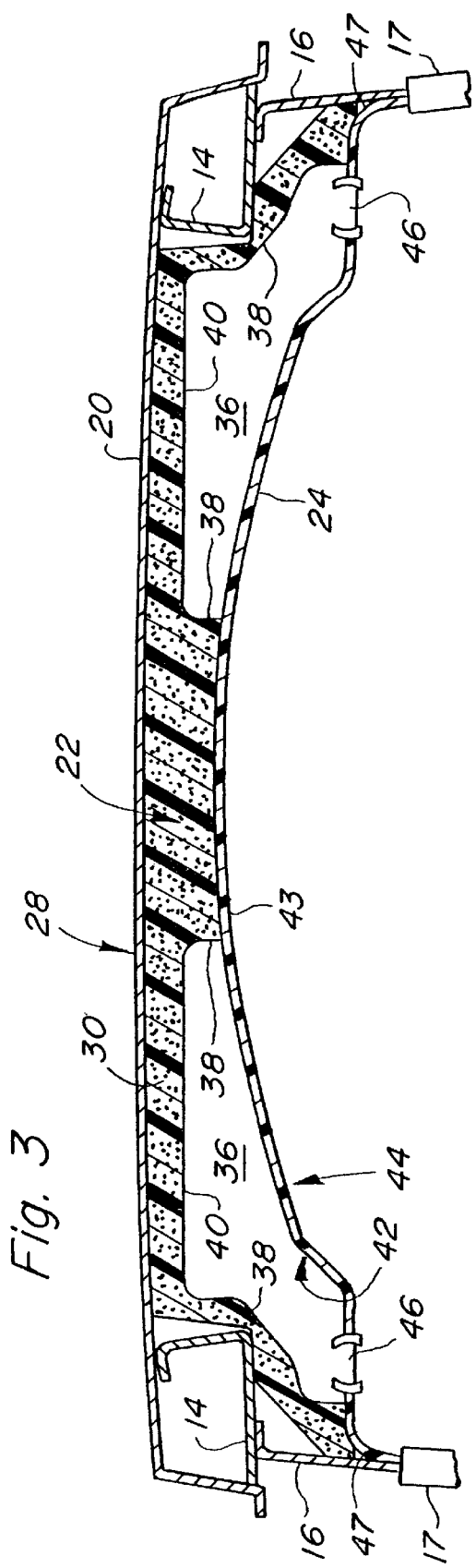
FIG. 3 is a cross sectional view taken along line 3—3 in FIG. 2.
Figure 4:
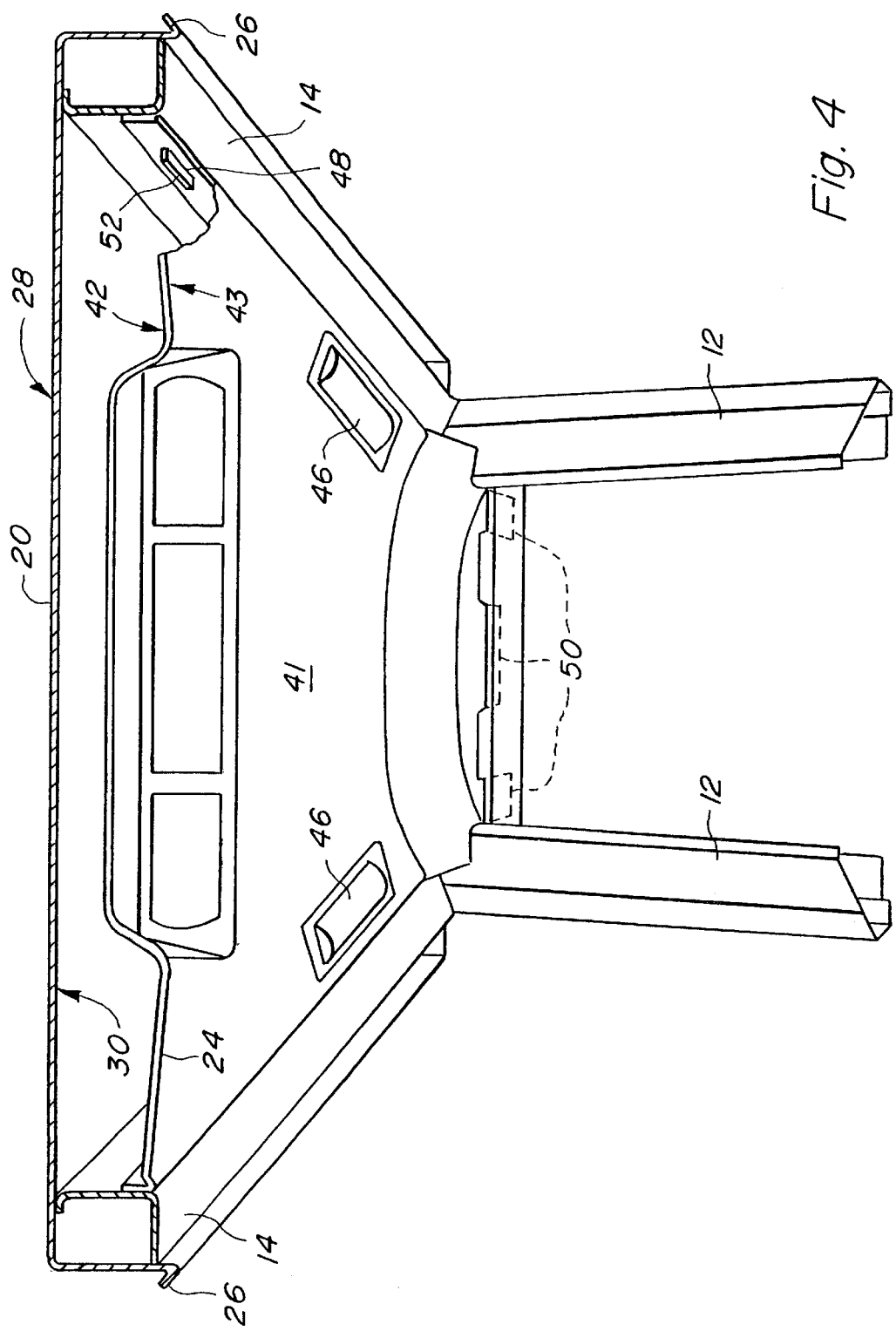
FIG. 4 is a cross sectional view of the roof structure without the foam liner which has been eliminated for illustration purposes.

The side edges 47 of the back half 43 of the headliner 24 rests on the top edges of windows 17 as seen in FIG. 3. The front half 41 of the headliner 24 is provided with side slots 48 and tabs 50 for supporting the headliner. The side slots 48 engages tabs 52 mounted to the horizontal members of the ROPS as shown in FIG. 4. Whereas tabs 50 are inserted into apertures formed in the ROPS also shown in FIG. 4. It should be noted that the foam liner has not been illustrated in FIG. 4 to better illustrate the headliner mounting structure.

The headliners primary function is noise reduction and it is constructed of a conventional porous material to let sound from the interior of the operator's compartment pass through to the sound absorbing foam liner where the sound is absorbed. This reduces operator's compartment noise level. The headliner's secondary function is to be the bottom wall of the ventilating ducts for the HVAC system, and retain the adjustable or fixed louvers for operator controlled or directed airflow.

Figure 5:
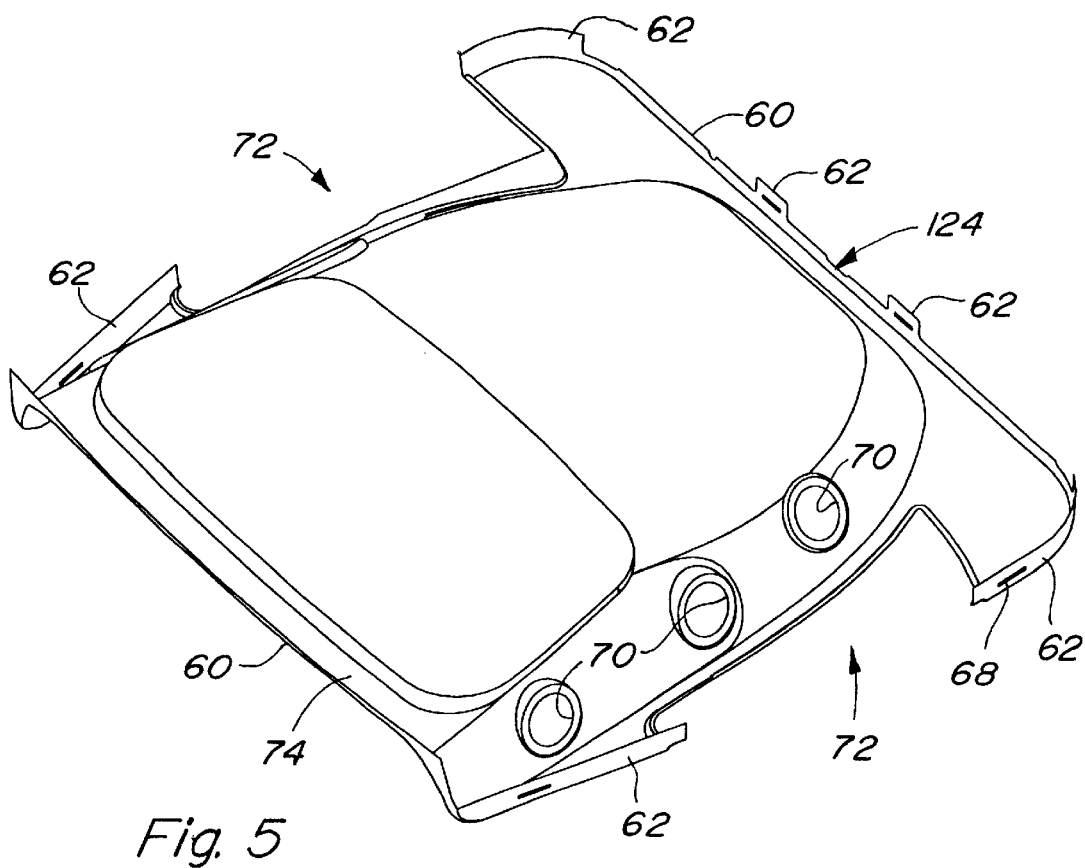
FIG. 5 is a perspective view of the upper surface of a headliner.

An alternative embodiment of the headliner is shown in FIG. 5 and designated generally 124. The headliner 124 is mounted to the frame structure using flanges with slots that receive tabs similar to the slots 48 and tabs 52 described above and shown in FIG. 4. The headliner 124 is formed with an upstanding rib 60 about the perimeter of the headliner. The rib 60 extends substantially about the entire perimeter but may have some interruptions. The rib 60 increases the bending strength of the headliner. At periodic locations about the perimeter of the headliner, upstanding flanges 62 are provided that extend above the rib 60. The upstanding flanges 62 extend upward and slightly outward at an angle of five to ten degrees from vertical. The flanges 62 each have an opening therethrough such a slot 68.

Figure 6:
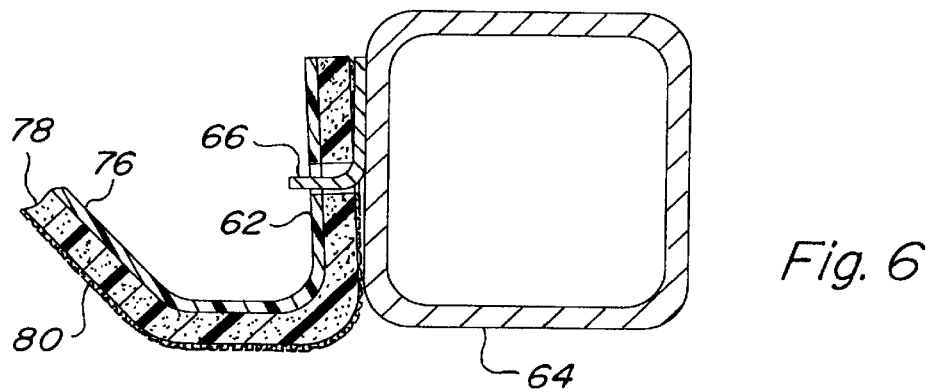
FIG. 6 is a sectional view of the headliner of FIG. 5 mounted to the structural frame of the operator's compartment.

The headliner 124 is mounted to the horizontal members 64 of the operator's compartment structural frame as shown in FIG. 6. In this case, the structural frame is a roll over protective structure (ROPS). The horizontal members 64 are metal tubes with tabs 66 attached thereto by welding or by other fasteners. The tabs 66 extend inward from the horizontal members 64. The headliner is installed in the operator's compartment by deflecting the flanges 62 inward so that the upper end of each flange passes over the distal end of the respective tab 66. Once the tab 66 is aligned with the slot 68 in the flange 62, the flange 62 will return to, or near to, its nominal position.

The headliner 124 is of a laminate structure having a plastic substrate 76 of ABS, styrene or similar material. The substrate 76 is perforated to permit sound from the interior of the operator's compartment to pass through the headliner and into the foam liner 22 as described above. A layer of open cell foam 78 is bonded to the lower surface of the substrate 76 by an adhesive in a roll coating process. An interior cover 80 is applied to the inner surface of the foam 78 through a flame bonding process. The cover 80 can be a non-woven or woven fabric, perforated vinyl or leather etc.

Once the laminate structure is formed and cut to length in a sheet, it is heated and vacuum formed to the desired shape. After forming, various openings and cut outs are made by water jet trim. The vacuum forming process, which turns up the rib 60 and flanges 62, creates a living hinge where the substrate is bent upward. The hinge provides resiliency to the substrate to enable the flanges 62 to flex inward to install the headliner. Once the tabs 66 are aligned with the slots 68, the flanges will return toward the nominal position but may not fully return there due to the presence of the structural frame horizontal members 64. This results in the foam layer 78 being partially compressed and the formation of a tight or snug fit between the headliner and the upper horizontal members 64 of the frame. The result is a pleasing appearance to the interior appearance of the operator's compartment without any visible fasteners for the headliner. Furthermore, it is easier and faster to install the headliner.

The headliner 124 has openings 70, 72 for ventilation grills, radio or HVAC control panels, etc. In the embodiment shown, the headliner 124 has a flat portion 74 along the front. The flat portion 74 rests beneath the horizontal member 64 of the ROPS at the front of the operator's compartment. The structural strength provided to the headliner by the molded plastic substrate and the rib 60 allows the headliner to span across the front of the operator's compartment without additional attachments to the structural frame at that the front. Alternatively, various interior components, such as a sun visor and/or rear view mirror can be bolted through the headliner into the frame along the front, which would provide additional attachment of the headliner to the frame structure.

The headliner 124 can be used as described above to complete air ducts in the roof. Alternatively, the headliner 124 can be used in applications where it is not used to form air ducts.

The invention should not be limited by the above described embodiment, but should be limited solely by the claims that follow. For example, the openings through the flanges 62 may be round holes fitted over inwardly extending pins on the frame.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

We claim:

1. An operator's compartment for a vehicle comprising:
   a structural frame having generally horizontal upper members at an upper end of the frame;
   an interior headliner having at least one upwardly extending flange along a portion of a perimeter of the headliner with an opening through the flange;

a generally horizontal member projecting inward from the upper member of the frame and extending through the opening in the headliner flange to support the headliner on the frame.

2. The operator's compartment as defined by claim 1 wherein the headliner has a plurality of flanges and openings and the frame has a plurality of projecting members.

3. The operator's compartment as defined by claim 1 wherein the frame is a rollover protective structure.

4. The operator's compartment as defined by claim 1 wherein the headliner is a laminate body having a substrate layer, a foam layer on the substrate and a cover layer in the foam layer forming an interior surface of the headliner in the operator's compartment.

5. The operator's compartment as defined by claim 4 wherein the substrate is resilient to enable the flange to be deflected inwardly as the headliner is raised into position until the projecting member aligns with the opening.

6. The operator's compartment as defined by claim 4 wherein the foam on the flange is compressed by the frame structure to form a tight fit between the headliner and the frame.

\* \* \* \* \*